United States Patent

[11] 3,603,317

| [72] | Inventor | John Raymond Sharp<br>15 High Street, Beadfordshire, Clophill, England |
|---|---|---|
| [21] | Appl. No. | 793,988 |
| [22] | Filed | Jan. 27, 1969 |
| [45] | Patented | Sept. 7, 1971 |
| [32] | Priority | Jan. 29, 1968 |
| [33] | | Great Britain |
| [31] | | 4543/68 |

[54] POD REMOVAL APPARATUS
7 Claims, 8 Drawing Figs.

[52] U.S. Cl. .................................................. 130/30
[51] Int. Cl. .................................................. A01d
[50] Field of Search .................................. 130/30, 30 A, 30 C, 5 G, 30 J; 171/60, 61, 28, 58; 56/19, 128, 130

[56] References Cited
UNITED STATES PATENTS

| 944,945 | 12/1909 | Calkins | 171/61 |
| 1,723,492 | 8/1929 | Ryder | 130/30 A |
| 2,956,628 | 10/1960 | Rogers et al | 130/30 C |
| 3,036,419 | 5/1962 | Magnuson et al | 130/30 A |

FOREIGN PATENTS

| 707,043 | 5/1941 | Germany | 171/60 |

Primary Examiner—Antonio F. Guida
Attorney—Larson, Taylor and Hinds

ABSTRACT: The invention includes an apparatus for removing pods from a plant e.g. a pea plant. In a preferred embodiment of the invention the apparatus comprises a gripping means which may be in the form of a pair of rollers or belts, control means for restricting the freedom of angular movement of pod bearing portions of the plant, and pod plucking means located adjacent the control means. The pod plucking means may be in the form of a pair of cooperating rollers, one longitudinally ribbed and the other with a plane cylindrical surface, whilst the control means may be provided by the gripping rollers or where gripping belts are used instead, by an additional control roller located between the belts and the plucking means. Driving means are also provided for driving the gripping means and the control means.

PATENTED SEP 7 1971
3,603,317
SHEET 1 OF 2
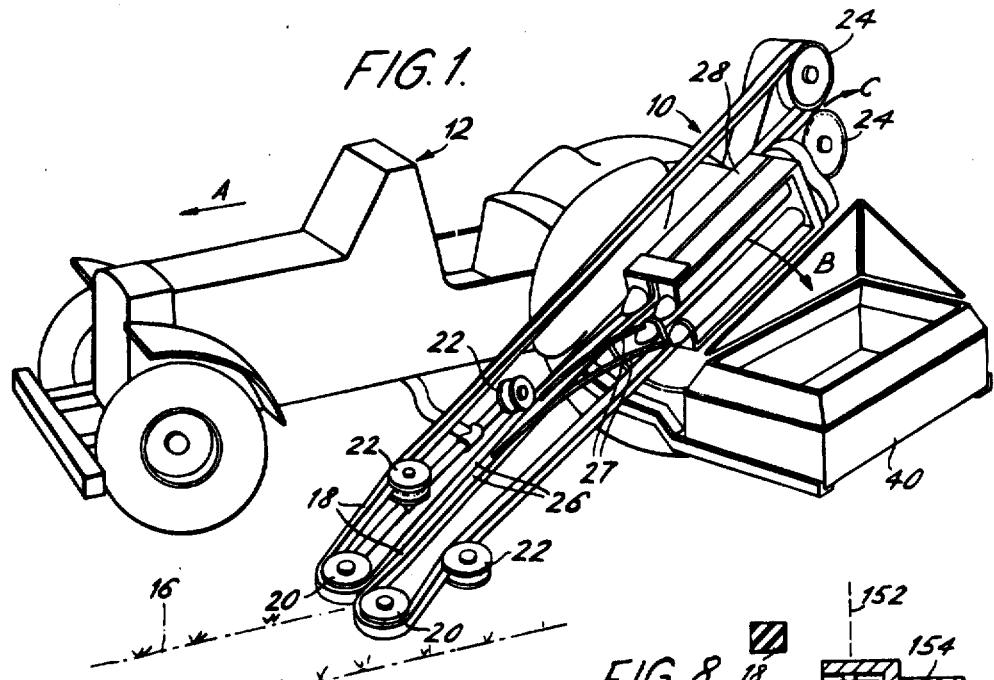
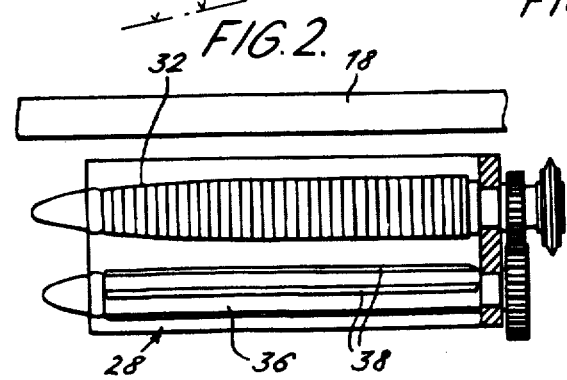
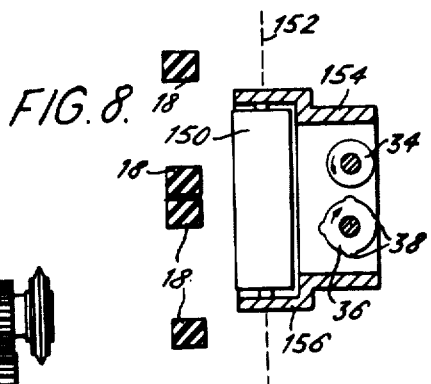
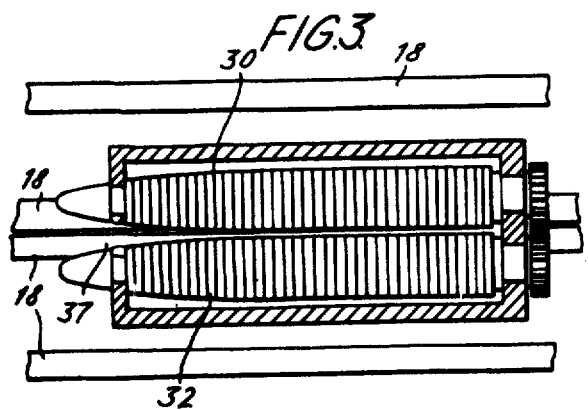
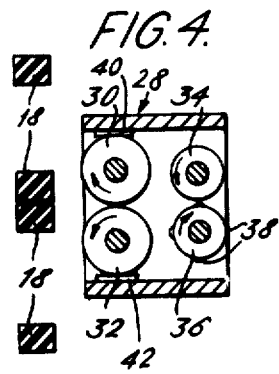

POD REMOVAL APPARATUS

This invention relates to the picking of pods from their stem, and in particular to the picking of pods of so called "-green" peas. Green peas are usually planted in straight rows with a narrow separation, of several inches, between adjacent rows. It has been found by experience that such peas tend to grow only on the upper end portion of the stem, say only on the upper two-thirds to three-quarters of the total height of the stem. It is desirable, whether the peas are to be marketed fresh in the pod or subsequently shelled and cleaned for canning or freezing, that the amount of stem remaining mixed with the pods after removal from the plant, should be reduced as far as possible.

An apparatus for the picking of green peas in the pod is already known from copending Pat. application No. 47399/65, now United Kingdom Pat. No. 1,164,993.

With this known pod removal apparatus, when a plant is encountering resistance to its passage through the plucking rollers on account of a pod being removed from the plant stem by the plucking rollers, there is a tendency for the following pods to jockey for a suitable entrance position into the plucking rollers and hence for two or more of these pods to be accepted simultaneously by the plucking rollers. This has been found to encourage breakage of the plant stem in the apparatus.

According to one aspect of the present invention, an apparatus for removing pods from a plant includes gripping means arranged to draw the plant in a direction root end first through pod plucking means and control means adapted to restrict the freedom of angular movement of pod bearing portions of the plant immediately prior to the passage of these portions through the plucking means.

The term "angular movement" used above and elsewhere in the specifications, refers to changing orientation of the plant portions concerned with respect to their intended direction of travel through the plucking means.

The new pod removal apparatus described, by reducing the freedom of angular movement of the plant portions concerned, reduce the tendencies above described as encouraging breakage of the plant stems during their journey through the apparatus.

The gripping means and the control means may, for example, comprise a single common pair of rotatable gripping rollers arranged close to the plucking means and having adjacent gripping surfaces urged towards each other by resilient loading of the gripping rollers.

Both the gripping rollers are preferably driven and are arranged to present therebetween a tapered throat to the incoming plants so that, in operation, incoming plants move some way along the throat before they are gripped by the gripping rollers. The throat may, for example, extend half way or more along the length of the gripping rollers.

An alternative form of gripping means for use in the apparatus of the present invention is envisaged, which alternative form comprises a pair of endless belts having adjacent runs urged towards each other by resilient loading and adapted to grip each plant at the basal portion of the plant, the gripping means being associated with separate control means located close to the plucking means to reduce the freedom of angular movement of pod bearing portions of the plant immediately prior to the passage of these portions through the plucking means. The separate control means could, for example, comprise an appropriately orientated soft covered roller about which the plant could move, causing rotation of the roller, as the plant is pulled by the belts from the plucking means.

According to another aspect of the invention, an apparatus for removing pods from a plant includes pod plucking means arranged to present to the plant a passageway which is adapted to pass at all times the stem of the plant, and which passageway enlarges to allow nodes of the stem to be pulled through the passageway, the periods of enlargement of the passageway being arranged to be normally insufficient however to allow a normal sized pod to be pulled through the passageway. By thus facilitating the passage of the plant stem and its nodes through the passageway and discouraging the passage of pods therethrough, the plucking means is effective to cause separation from the stem of pods situated at positions progressively more remote from the basal portion of the plant.

The present invention thereby overcomes another disadvantage of the known apparatus; that is unable to distinguish in operation between a node on the plant stem and a pod of substantially normal size where, e.g. in the case of a pea plant, both the node and the pod have similar girths. There is therefore a tendency in the known apparatus, at least when used with pea plants, for the plant stem to be snapped off by the plucking means whenever and wherever a node of the stem is presented to the apparatus.

The plucking means of the present invention may, for example, comprise a pair of plucking rollers, the passageway of the present invention being provided by a gap defined between adjacent generating surfaces of the two plucking rollers, which surfaces are arranged, on rotation of the plucking rollers, to move, at their point of closest approach in an opposite direction to that in which the plant therebetween is to be moved, the shaping and relative disposition of the plucking rollers being such that the gap varies, on rotation of the plucking rollers, between a first condition in which only the stem of the plant may pass between the plucking rollers, and an enlarged condition in which also the nodes of the stem may pass between the plucking rollers, the periods of enlargement being arranged to be normally insufficient however to allow the passage through the gap of a normal sized pod.

Preferably one of the plucking rollers has a surface provided with longitudinal ribs cooperating with the surface of the other of the plucking rollers so that, in operation, the minimum valves of the gap correspond to the points of closest approach of the ribs of said one plucking roller to the surface of said other plucking roller.

The invention also comprises a pod removal apparatus including the combination of one of the new gripping means above described with the new plucking means above described.

The invention further includes a pod removal apparatus for use along a row of plants, the apparatus including lifting means to engage and lift the plants from the ground, and gripping means arranged to draw each lifted plant in a direction root end first through pod plucking means and to reduce the freedom of angular movement of pod bearing portions off the plant immediately prior to the passage of these portions through the plucking means, the pod plucking means being arranged to present to the gripped plant a passageway which is adapted to pass at all times the stem of the plant, and which passageway enlarges to allow the stem to be pulled through the passageway, the periods of enlargement of the passageway being arranged too be normally insufficient however to allow a normal sized pod to be pulled through the passageway.

The gripping means may be associated with the lifting means by transfer means which are arranged to engage temporarily with the plants below the pod bearing portion thereof and to carry the plants rearwardly from the lifting means to the gripping means as the apparatus moves along the row of plants.

The lifting means may be provided by a pair of endless lifting belts having adjacent runs urged towards each other by resilient loading and adapted to grip the plants just above ground level and to free them from the ground.

The transfer means may also be provided by a pair of endless transfer belts having adjacent runs urged towards each other by resilient loading and adapted to hold the plants and to transfer them from the lifting means to the vicinity of the plucking means.

The lifting means and the transfer means may be provided by a same single pair of endless belts which have the end lifting portions of the opposed surfaces of their adjacent runs lying in substantially vertical planes, and the end transfer portions of the opposed surfaces lying in substantially vertical planes and located portions of the belts intermediate between the end lifting portions and the end transfer portions thereof.

Alternatively, the lifting means and the transfer means may be provided by a same single pair of endless belts which have the end lifting portions of the opposed surfaces of their adjacent runs lying in substantially vertical planes, and the end transfer portions of the opposed surfaces of their adjacent runs lying in substantially horizontal planes.

The invention also extends to an assembly including a plurality of the new pod removal apparatus above described arranged for simultaneous operation on a corresponding plurality of rows of plants. If the lifting means and transfer means are as described in the preceding paragraph, the endless belts there referred to, are conveniently staggered at their end lifting portions and at their end transfer portions, to increase the separation of adjacent apparatuses and thereby reduce the likelihood of a plant in one of the apparatuses interfering with the operation of the adjacent apparatus.

It is also envisaged that if transfer belts are used to transfer the plants from lifting means to the vicinity of the plucking means, it might be advantageous to extend these belts rearwardly of the plucking means by a distance equal to the length of the plant stems to ensure that the heads of the plants are free from the gripping means before the basal portions of the plants are released by the transfer belts. This reduces the chance of stems tangling in the transfer belts after plucking has taken place.

In order that the invention may be more fully understood, embodiments thereof will now be described, by way of example, with reference to the accompanying drawings of which:

FIG. 1 is a general perspective view of a pod removal apparatus according to a first embodiment of the invention, mounted for use with a tractor;

FIG. 2 shows in plan view a detail of an assembly of gripping rollers and plucking rollers used in the apparatus of FIG. 1;

FIG. 3 shows in side view the assembly of FIG. 2;

FIG. 4 shows an end view of the assembly of FIGS. 2 and 3;

FIG. 8 shows an end view of an alternative form of gripping means to that shown in FIGS. 1 to 7.

Figure 5:
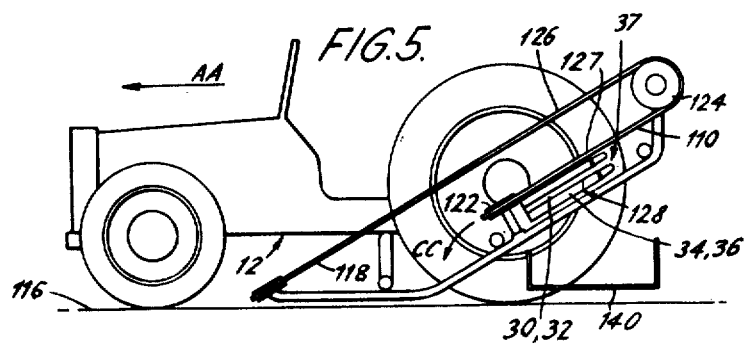
FIG. 5 is a side view of a pod removal apparatus according to a second embodiment of the invention, mounted for use with a tractor.

Referring first to FIGS. 1 to 4 of the drawings a pod removal apparatus 10 mounted on a tractor 12 for movement in a direction A along a row of pea plants 16.

The apparatus 10 includes a pair of resiliently loaded belts 18 each of which passes at its lowermost and foremost region, about a respective pulley 20 mounted for rotation in an inclined plane extending rearwardly of the pulleys 20 at an angle of about 30° to the ground.

Adjacent portions of the belts 18 provide, between the pulleys 20, lifting means for engaging and lifting the plants 16 from the ground.

The remaining portions of the belts 18 are supported by a plurality of pulleys 22, 24 of which the pulleys (24) of the uppermost pair of pulleys, are mounted one over the other for rotation in substantially vertical planes.

The intermediate pulleys 22, only some of which have been shown, are mounted for rotation in planes more nearly approaching a vertical plane as the pulleys 22 approach the pulleys 24, and more nearly approaching a plane inclined at 30° to the ground as the pulleys 24 approach the pulleys 20, thereby to ensure the adjacency of intermediate portions 26 of the belts 18. These portions 26 provide transfer means for holding and transferring the plants upwardly and rearwardly of the pulleys 20.

In order to simplify the drawings and thereby provide a clearer understanding of the invention, the structure for supporting the various pulleys 20, 22, 24 has not been shown in full. GUide wires 27 are mounted on the pulley supporting structure in a plane containing the upper edges of the adjacent faces of belt portions 26.

Adjacent the upper portions of the belts 18 on the opposite side thereof to the tractor 12, is located a roller assembly 28 most clearly shown in FIGS. 2 to 4.

The roller assembly 28 has a first pair of rollers 30, 32 each of about 1½inches to 2½inches diameter, mounted alongside and close to a second pair of rollers 34, 36.

The rollers 30 to 36 are axially coextensive with one another, and the axes of rotation of the rollers are substantially parallel to one another and to the belt portions 26 of the belts 28.

The first pair of rollers 30, 32 are resilient loaded so as to be urged towards one another as indicated diagrammatically by 40 and 42 in FIG. 4. These rollers have smooth surfaces and, as shown in FIG. 4 for example, they are arranged to have the nip of the rollers in substantially the same reference plane as the opposed faces of the belt portions 26. The rollers 30, 32 are disposed as best shown in FIG. 3, to present between themselves a throat 37 extending at least halfway up the length of the roller assembly. These rollers provide gripping means for gripping plants introduced into the throat 37 by the belt portions 26 above referred to. In addition the rollers 30, 32, provide control means for restricting the freedom of angular movement of the pod bearing portions of the plant immediately prior to the passage of these portions through the plucking means and to this end, the separation of their gripping surfaces from the cooperating parts of the rollers 34, 36 should be not more than about four inches and is preferably smaller.

The second pair of rollers 34, 36 each of substantially the same diameter as the rollers 30 and 32, are not resiliently loaded but are instead mounted for rotation about fixed axes. The upper roller 34 of this pair has a smooth surface, but the lower roller 36 is provided with four longitudinally extending ribs 38. The rollers 34, 36 have their axes of rotation arranged symmetrically one on each side of the reference plane above referred to. These rollers provide plucking means for separating pods from plant stem gripped by the rollers 30, 32. The separation of the plucking rollers 34, 36 is such that with one of the ribs 38 opposite the upper roller 34, there is sufficient space for the free movement of a stem between the rollers but not for a node or a pod, while when an interval between adjacent ribs 38 is opposite the upper roller 34, there is a space between the rollers of sufficient diameter to accept the girth of nodes and pods.

A collecting bin 40 is mounted on the tractor 12 for collecting pods separated, as hereinafter described, by the rollers 34, 36.

Connecting means (not shown) are provided for enabling the pulleys 24 and each of the four rollers 30 to 36 to be driven by a power takeoff from the tractor 12.

In operation of the apparatus above described, the tractor 12 moves the apparatus 10 along the row of plants 16 and the pulleys 24 are driven to give an upward movement of the intermediate portions 26 of the belts 18.

The rollers 30 and 36 are rotated in a clockwise sense when viewed from the front of the apparatus, and the rollers 32 and 34 in an anticlockwise sense.

Thus, as the apparatus is moved forward along the row of plants 16, the belts 18 at their lowermost and foremost region grip the plants below their pod bearing positions and lift them one by one from the ground. The plants are then fed by the transfer portions (26) of the belts 18 upwardly and rearwardly of the pulleys 20, and the 90° twist in the belts 18, together with the support afforded to the plants by the guide wires 27, facilitates the entry of the plants into the throat 37 presented by the gripping rollers 30, 32. The presence of the throat 37 discourages bunching of the plants 16 during their axially directed entry between the gripping rollers.

On reaching the pinch point between the gripping rollers 30, 32 at the end of the throat 37, the plants are gripped by the gripping rollers below the pod bearing portions thereof, and rotation of the gripping rollers causes the plants to be pulled through the gap between the plucking rollers 34, 36. This gap provides a passageway for the pod bearing portions of the plants as they are pulled through the plucking assembly by the gripping rollers.

As will be apparent from the above description, the relative disposition of the rollers 34, 36 is such that, on rotation, these rollers present a gap of varying size to the pod bearing portions of the plants, but the speed of the rotation of these rollers is such that, for rollers of the dimensions above described, enlargements of the gap sufficient to accept the girth of both nodes and pods are present for times sufficient to allow passage of the nodes through the gap but insufficient to allow the passage of a pod therethrough on account of its much greater length. With the particular apparatus described (plucking rollers of about 1½ inches diameter), the preferred speed of rotation is within the range 100 to 400 r.p.m. with an optimum value of about 250 r.p.m. with this latter value the peripheral speed of the gripping rollers is then such as to draw the plant through the plucking rollers with a linear velocity of about 25 inches per second.

Pods thus plucked off from the plant stem are expelled from the roller assembly, as indicated by the arrow B in FIG. 1, and fall into the collector bin 40. The stripped stems, still gripped at their basal portions by the belts 18, are expelled to a ground at the rear of the apparatus 10, as indicated in the drawing by the arrow C.

In the second embodiment of the invention shown in FIG. 5 a pod removal apparatus 110 is mounted on a tractor 12 for movement in a direction AA along a row of pea plants 116.

The apparatus 110 includes a pair of resiliently loaded belts 118, each of which passes, at its lowermost and foremost region, about a respective pulley 120 mounted for rotation in an inclined plane extending rearwardly of the pulleys 120 at an angle of about 30° to the ground. Adjacent portions of the belts 118 provide, between the pulleys 120, lifting means for engaging and lifting the plants 116 from the ground.

The remaining portions of the belts 118 are supported by a plurality of pulleys 122, 124 of which the pulleys (124) of the uppermost pair of pulleys are mounted one beside the other for rotation in respective substantially vertical planes.

The pulleys 122 are mounted beneath intermediate portions 126 of the belts for rotation in a plane parallel to that in which the pulleys 120 rotate. The belt portions 126 together with the belt portions 127 located between the pulleys 124 and 122, provide transfer means for holding and transferring the plants upwardly and rearwardly of the pulleys 120.

In order to simplify the drawings and thereby provide a clearer understanding of the invention, the structure for supporting the various pulleys 120, 122, 124 has not been shown in full.

Adjacent and below the belt portions 127 is located a roller assembly 128 which is identical in construction and dimensions to the roller assembly 28 already illustrated in and described with reference to, FIGS. 2 to 4. In contrast to the assembly 28 however, the assembly 128 is orientated to have the two gripping rollers (30, 32) as the top rollers of the assembly and the two plucking rollers (34, 36) as the bottom rollers thereof so that the nip of the rollers 30, 32 lies in substantially the same (vertical) plane as the opposed faces of the adjacent belt portions (127). The rollers 34, 36 then lie symmetrically one on each side of this plane.

In contrast to the apparatus of FIG. 1, the assembly 128 is arranged to receive plants approaching its uppermost end so that the throat 37 is presented to the approaching plants by the uppermost halves of the top two rollers.

A collecting bin 140 is mounted on the tractor 12 for collecting pods separated by the rollers 34, 36.

Connecting means (not shown) are provided for enabling the pulleys 124 and each of the four rollers 30 to 36 to be driven by a power takeoff from the tractor 12.

In operation of the apparatus above described with reference to FIG. 5 of the accompanying drawings, the tractor 12 moves the apparatus 110 along the row of plants 116 and the pulleys 124 are driven to give an upward movement of the intermediate belt portions 126 of the belts 118 and a corresponding downward movement of the belt portions 127. The rollers 30 to 36 are rotated in the same sense as in the assembly 28 and cause the separation of pods from the plant stems in the same way as do the roller of that assembly, substantially the only difference in operation between the two assemblies 28 and 128 being that in the latter case the plant stems are hanging downwardly from their basal portions (gripped by belt portions 127) when they enter the assembly 128, and pods separated by the rollers 34, 36 are expelled downwardly into the appropriate bin (140) instead of in the horizontal direction (B) of the earlier embodiment.

Stripped stems, which having been through the plucking rollers, are still gripped at their basal portions by the belts 118, are expelled to ground forwardly of the pulleys 122 as indicated in the drawing by arrow CC.

Figure 6:
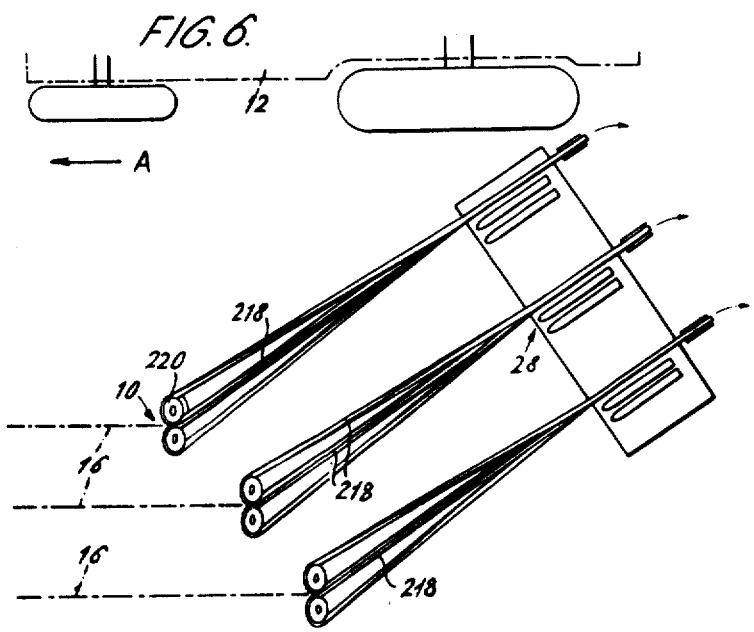
FIG. 6 is a diagrammatic plan view of an array of pod removal apparatuses according to the first embodiment of the present invention.

Instead of using a single apparatus as shown in FIGS. 1 to 5, advantage may be taken of the invention to provide an array of such apparatuses for harvesting several rows of peas at a time. A first example of such an array is shown in FIG. 6 and comprises a plurality of pod removal apparatuses 10. Each apparatus 10 is similar to that illustrated in and described with reference to FIGS. 1 to 4, and is provided with an appropriate collector bin (not shown) and tractor mounting (not shown). The tractor, in operation, moves the assembly over the rows of peas in the direction A, the end pulleys 220 of each pair being arranged to lie opposite one another, one on each side of the appropriate row of pea plants 16.

In side view, the transfer portions of the belts 218 in FIG. 6 are all inclined at a same angle (about 30°) to the ground, while in plan view they make an angle of about 45° with the direction of motion A.

Figure 7:
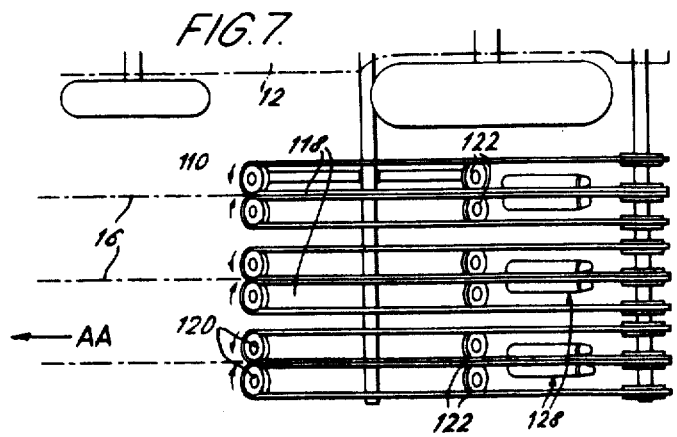
FIG. 7 is a diagrammatic plan view of an array of pod removal apparatuses according to the second embodiment of the present invention.

A second example of an array of pod removal assemblies according to the present invention is shown in FIG. 7 and comprises a plurality of pod removal apparatus 110. Each apparatus 110 is similar to that illustrated in, and described with reference to FIG. 5, and is provided with an appropriate collector bin (not shown) and tractor mounting (not shown). The tractor, in operation, moves the assembly over the rows of peas in the direction AA, the end pulleys 120 being arranged to lie in a line lying normal to the direction AA, with the pulleys 120 of each path one on each side of the appropriate row of plants 16.

In side view, the transfer portions of the belts 118 in FIG. 7 are inclined at a same angle (about 30°) to the ground, while in plan view they lie parallel to the direction of motion AA.

An alternative form of gripping assembly to that shown in FIGS. 1 to 7 is illustrated in FIG. 8. In this alternative form the rollers 30, 32 of the earlier arrangement (see FIG. 4) are replaced by a soft covered roller 150 which is located between the belts 18 and the plucking rollers 34, 36. In this variation the belts 18 provide the gripping means and the roller 150 serves as the control means for reducing the freedom of angular movement of pod bearing portions of the plants during their passage between the rollers 34, 36. To this end, the roller 150 is freely rotatable about an axis 152 which is substantially perpendicular to the direction of travel of the gripping surfaces of the belts 18 and to the direction of travel of the plant through the plucking rollers. The separation of the axis 152 from the cooperating parts of the roller 34, 36 should not be more than about 4 inches and is preferably smaller. The assembly casing 154 is provided with an enlarged portion 156 to accommodate the bearings (not shown) for the roller 150. It will be understood however that the construction and mounting of the plucking rollers 34, 36 and the belts 18 are identical to those described in relation to FIGS. 1 to 7.

In operation the belts 18 carry the plants upwardly and rearwardly and the stems of the plants pass axially along the throat presented by the tapered rollers 34, 36 until the control roller 150 is engaged. Thereafter the belts 18 are effective to pull the stem of the plant over the control roller which prevents undue angular movement of the pod bearing portions of the plant as it passes between the plucking rollers. Although not evident from FIG. 8 in plan view the axis 152 is located substantially opposite the operative parts of the rollers 34, 36 (as opposed to their tapered portions) so that the belts 18 will not be effective to pull a plant through the plucking rollers until these latter are effective to remove the pods from the plant.

In a variation of the embodiment above described with reference to FIG. 8 the belts 18 shown in that FIG. are transfer belts arranged to move at a higher speed than the lifting belts moving at the pulleys 20 and to take the plant from the lifting belts prior to arrival at the plucking assembly. With the plucking rollers still of the same diameter and an angular velocity of about 250 r.p.m. as in the embodiment of FIGS. 1–4, the transfer belts will then preferably be driven to move the plant through the plucking assembly at a linear speed of about 25 inches per second.

Although the pod removal apparatuses and arrays of the present invention have been described above by way of example with respect to their use with pea plants, it will be appreciated that their use is also envisaged with other pod bearing plants e.g. beans, especially broad beans. Modifications to the dimensions and detailed designing of the apparatuses and/or arrays might prove necessary in such cases.

I claim:

1. Apparatus for removing pods from a plant, the apparatus comprising: (a) gripping means having surfaces for gripping the plant; (b) pod plucking means having surfaces for plucking pods from the plant; (c) driving means arranged to move the gripping surfaces and the pod plucking surfaces in directions away from one another, and (d) at least one control surface located adjacent said pod plucking means to prevent movement of the plant transversely to the direction of movement of the pod plucking surfaces.

2. Apparatus as claimed in claim 1 wherein the gripping means and the control means are constituted by a single common pair of rotatable gripping rollers arranged close to the plucking means, the gripping surfaces being urged towards each other by resilient loading of the gripping rollers.

3. Apparatus as claimed in claim 1 wherein the gripping means comprises a pair of endless belts having adjacent runs urged towards each other by resilient loading, and the control means comprises a soft covered roller located between the gripping means and the plucking means and rotatable about an axis substantially perpendicular to the direction of travel of the gripping surfaces and to the direction of travel of the plant through the plucking means.

4. Apparatus as claimed in claim 3 wherein the plucking means comprise a pair of plucking rollers adjacent generating surfaces of which define the passageway, said driving means being adapted to rotate the plucking rollers, so that at their point of closest approach said generating surfaces move in an opposite direction to that in which the plant therebetween is to be moved, a generating surface of at least one of the plucking rollers being provided with longitudinal ribs and the generating surface of the other of the plucking rollers cooperating with that of said one roller whereby the minimum values of the passageway correspond to the points of closest approach of the ribs of said one plucking roller to the surface of said stem plucking roller.

5. Apparatus as claimed in claim 1 comprising a pair of endless belts arranged to have adjacent runs with opposed and cooperating surfaces, lifting means for engaging and lifting the plant from the ground, and transfer means for transferring the plant from said lifting means to the gripping means, said transfer means being provided by portions of said cooperating surfaces lying in a substantially vertical plane and located intermediate said lifting means and said gripping means.

6. Apparatus as claimed in claim 1 comprising a pair of endless belts arranged to have adjacent runs with opposed and cooperating surfaces, lifting means for engaging and lifting the plant from the ground, and transfer means for transferring the plant from said lifting means to the gripping means, said transfer means being provided by portions of said cooperating surfaces lying in a substantially horizontal plane and located intermediate said lifting means and said gripping means.

7. A pod removal apparatus as claimed in claim 1 comprising lifting means for lifting the plants from the ground, and transfer belts for transferring the plants from the lifting means to the vicinity of the plucking means, said belts extending rearwardly of the plucking means by a distance not smaller than the length of the plant stems to ensure that the heads of the plants are free from the gripping means before the basal portions of the plants are released by the transfer belts.